(No Model.)

G. HAYES.
METALLIC LATHING.

No. 420,656. Patented Feb. 4, 1890.

WITNESSES:
James R. McAfee.
Arthur Hayes

INVENTOR
Geo. Hayes.

UNITED STATES PATENT OFFICE.

GEORGE HAYES, OF NEW YORK, N. Y.

METALLIC LATHING.

SPECIFICATION forming part of Letters Patent No. 420,656, dated February 4, 1890.

Application filed October 9, 1889. Serial No. 326,455. (No model.)

*To all whom it may concern:*

Be it known that I, GEORGE HAYES, a citizen of the United States, and a resident of the city, county, and State of New York, have invented a new and useful Metallic Lathing, of which the following is a specification.

My invention consists of a lathing of sheet metal having at intervals throughout tongued apertures of polygonal shape, the perimeter of each opening having more than four sides and with all its angles obtuse, the aperture made by cutting incisions and turning outward the edge metal of the cuts outward until the proper size and shape of the opening are obtained. The edge metal so turned outward is left projecting beyond the plane of one side of the sheet as tongues, hooks, or barbs to grasp plaster when applied thereto, all as hereinafter more fully specified, reference being had to the accompanying drawings, in which—

Figure 1:
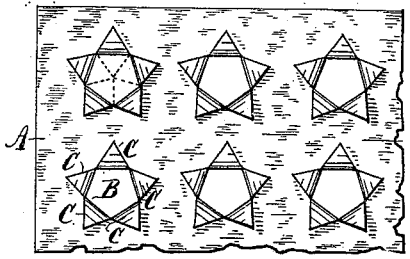
Figure 2:
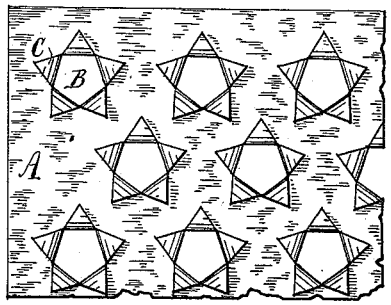
Figure 3:
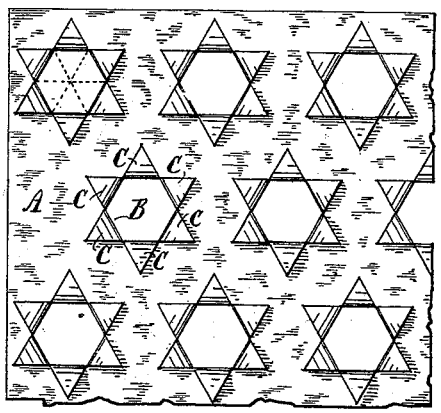
Figure 4:
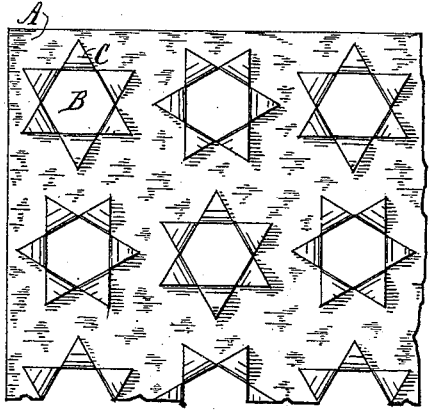
Figure 5:
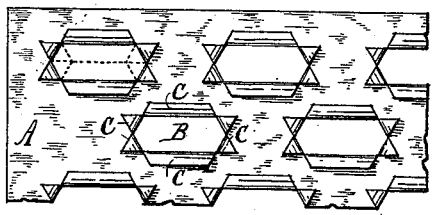
Figure 6:
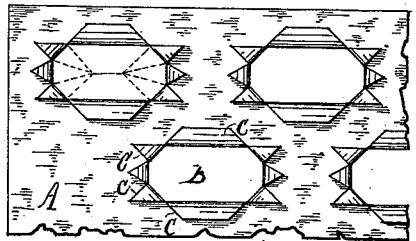

Figure 1 is a face view of a piece of the sheet-metal lathing, showing the tongued apertures of pentagonal shape arranged in direct lines. Fig. 2 is a face view of a piece of the lathing with pentagonal aperture arranged in diagonal line across the sheet. Fig. 3 is a face view of a piece of the lathing having tongued apertures of hexagonal shape arranged in diagonal lines across the sheet. Fig. 4 is a face view of a piece of the lathing having hexagonal apertures arranged in direct lines. Fig. 5 is a face view of a piece of the lathing with apertures of elongated hexagonal shape arranged in diagonal lines across the sheet. Fig. 6 is a piece of the lathing with apertures of octagonal shape arranged in diagonal lines across the sheet. Dotted lines in the upper left-hand apertures of Figs. 1, 3, 5, and 6 show the lines of cuts which are made through the sheet.

On the drawings, A indicates the sheet metal, which may be of any dimensions in sheet or strip.

B indicates the apertures, and C the tongues, hooks, or barbs formed of the edge metal of the incisions turned outward in forming the opening. They are given a backward bend or curl to enable plaster to be held thereby to the sheet, also to give a rounded or blunt verge to the opening. Plaster sets into the opening as in a dovetail mold, expanding at the back of the sheet, being thus "keyed" thereto. It also fits closely around behind and beneath the tongues, hooks, or barbs, and thereby effectually keyed to the face of the sheet. All of the tongues are clean cut and positively shaped and turned outward with uniformity.

What I claim as new, and desire to secure by Letters Patent of the United States, is—

1. A sheet-metal lath having at intervals throughout apertures at the verge of each of which are projecting tongues, hooks, or barbs of the metal turned outward in forming the aperture, the tongues all clean cut and positively shaped, and the perimeter of the aperture shaped as a polygon with all its angles obtuse, essentially as shown and described.

2. A sheet-metal lath having at intervals throughout apertures of polygonal shape whose perimeter consists of more than four sides and of which all angles are obtuse, each aperture formed by cutting incisions radiating from centers and turning outward with a backward bend or roll, the pointed edge metal from between the cuts to stand at the verge of the aperture, projecting beyond the plane of the sheet as tongues, hooks, or barbs to grasp plaster when applied thereto, as herein set forth.

GEO. HAYES.

Witnesses:
JAMES R. MCAFEE,
ARTHUR HAYES.